Patented May 14, 1946

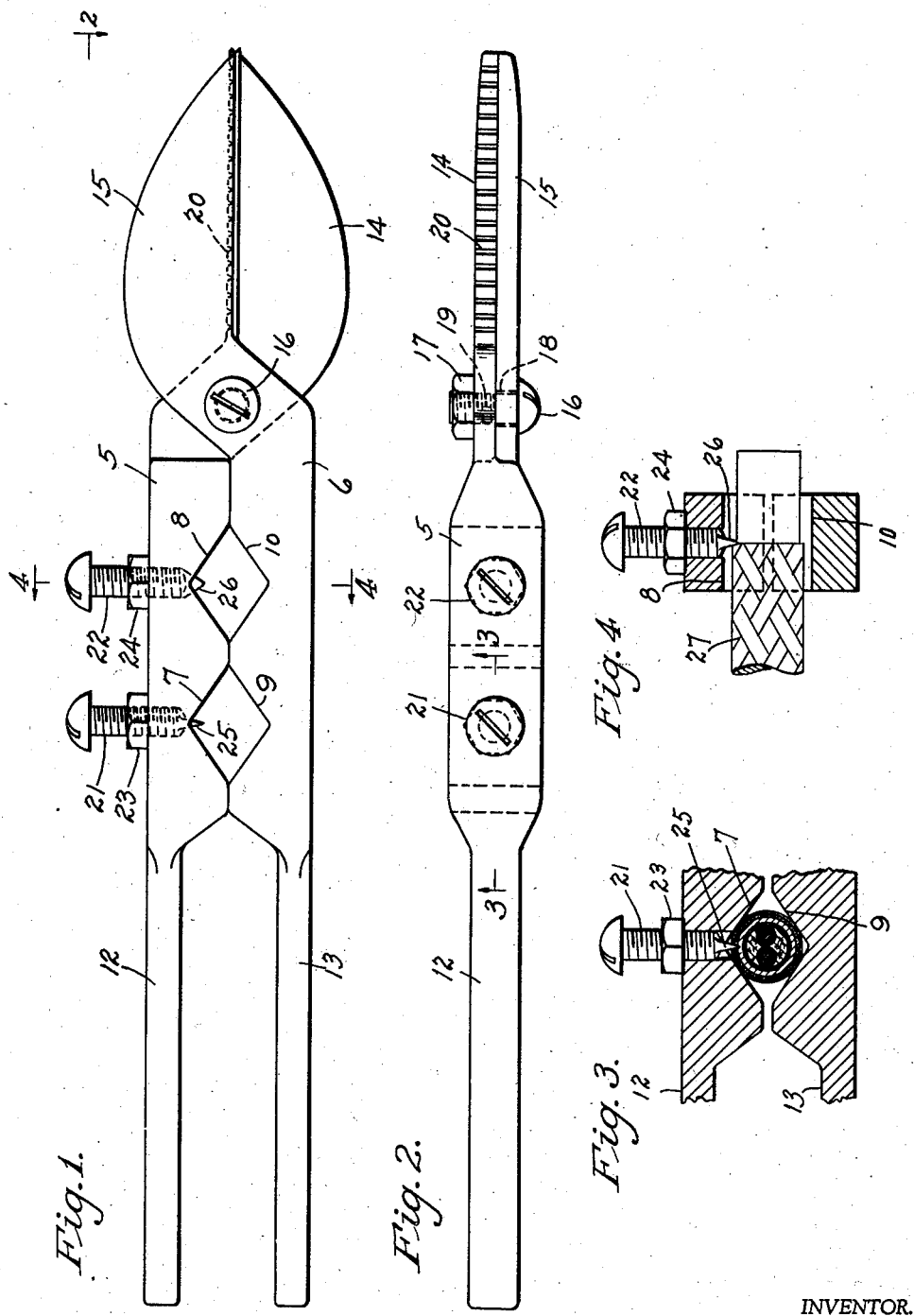

2,400,177

UNITED STATES PATENT OFFICE 2,400,177

TOOL

Walter Tomsick, Los Angeles, Calif.

Application July 24, 1943, Serial No. 495,985

2 Claims. (Cl. 30—91)

My invention relates to a tool primarily intended for stripping cable. The principal object of the invention is to provide such a tool for cutting, ringing and splitting woven, laminated metal and fabric sheathing of a cable.

It is also an object of the invention to provide snips on the tool for cutting metal materials.

My invention also has for its object to provide such a tool that is positive in operation, convenient in use, of improved structure, economical of manufacture, relatively simple and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a face view of a tool embodying the foregoing objects.

Fig. 2 is an edge view of said embodiment, taken on the line 2—2 of Fig. 1.

Fig. 3 is a broken, sectional view showing the use of a part of the present invention, taken on the line 3—3 of Fig. 2.

Fig. 4 is a transverse, sectional view, taken on the line 4—4 of Fig. 1.

Refering more in detail to the drawing, the reference numerals 5 and 6 indicate jaws that have complementary recesses 7 and 8 and 9 and 10 respectively. Handles 12 and 13 are provided on the jaws 5 and 6 respectively. Shearing heads 14 and 15 are integrally mounted on the jaws 5 and 6 beyond the pivot pin 16 from the handles. A nut 17 fastens the pivot pin 16 in position. The pin 16 is loosely mounted in a bore 18 in the jaw member 6. The jaw 5 is tapped, as indicated at 19, in which is screwed the threaded portion of the pin 16. By this means, the nut 17 and the threads on the pin 16 together tend to maintain the heads 14 and 15 in close shearing relationship. The head 14 has a serrated face 20 to aid in preventing slippage of material that is being sheared.

Projecting into the spaces at the apexes of the complementary recesses 7 and 8 are bolts 21 and 22. Lock nuts 23 and 24 respectively maintain the bolts 21 and 22 in position. The bolts 21 and 22 have arrowhead-shaped blades 25 and 26. Their tips are substantially identical. The tip shown at 25 indicates the side contour of both the tips 25 and 26, while the tip 26 shows the front shape of both of the tips 25 and 26.

In the use of my present tool, it may be used for cutting leaded cable of basket weave cable or marine cable, as well as many other uses.

The cable may first be placed in the opening formed by the complementary recesses 8 and 10, as suggested in Fig. 4. Then by forcing the handles 12 and 13 together, the point 26 pierces the armored basket weave covering 21. Then by revolving the handles 12 and 13 circumferentially around the cable, a ring is made which severs the basket weave at one side of the blade 26 from the woven covering on the other side of the blade.

Then the tool is moved to a position in which the cable is engaged by the opening formed by the complementary recesses 7 and 9. The handles 12 and 13 are again forced together, whereby the tip of the blade 25 pierces the basket weave sheathing of the cable. The present tool is then drawn lengthwise of the portion of the basket weave that had been previously ringed. The ringed and split basket weave may then be manually removed.

Thereupon the tool may be moved toward the end and a new bite may be taken with the blade 26 by piercing the layer of lead next outermost of the cable. The lead may be ringed and split in the manner described in connection with the basket weave. It is believed clear that both the basket weave and the lead coating may be ringed and split at the same time, if a margin of lead is not desired between the outer basket weave and the conductive wires within the cable. It is also believed clear that the snips may be used for shearing of the cable as well as for other cutting.

It is also believed clear that the present tool may serve as a gauge by having the tool the desired thickness, with the cutting blades 25 and 26 predetermined distances from the sides of the tool. It is also believed clear that the present tool serves both right-handed and left-handed.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A tool, comprising elongated straight side members pivotally connected to each other at one end and provided with handles extending from the opposite ends thereof, said members having relatively thick portions between the handles and the pivotal connection, presenting inner opposing surfaces arranged to flatly abut each other when said members are closed, said portions having complementary angular recesses forming, when together, substantially rectangular openings arranged in side by side relation; one of said portions being also provided with threaded bores, transversely thereof, and toward the other portion, opening at their inner ends through the apexes of its angular recesses, and bolt-like elements adjustably threaded into said bores, having outer adjusting heads and locking nuts seated against the outer surfaces of said bored portions, and having at their inner ends endwise projecting flattened diametrically disposed and tapering blades extending into the respective recesses of the bored portions of the members.

2. A tool comprising a pair of members pivotally connected together near an end thereof and provided with handles at the other end, said members formed intermediate their lengths with enlarged portions having inner faces which mutually abut when said members are closed, each of said enlarged portions having a pair of angular recesses which cooperate with each other when the members are closed to form substantially rectangular openings; one of said portions having a pair of bores penetrating transversely thereof and in line with the apexes of the angular recesses therein, members adjustably disposed in said bores, one of said members having a cutting edge at substantially right angles to the longitudinal axis of said portion and circumferentially movable with the said members to ring the insulation of a cable placed in one of said rectangular openings; and the other member having a cutting edge parallel with the longitudinal axis of said portion and movable with said members to cut the insulation of a cable placed in the other of said rectangular openings in said portions in a line parallel with the longitudinal axis of said cable, and means to lock each said member in position of adjustment.

WALTER TOMSICK.